United States Patent
Kuil et al.

(10) Patent No.: US 6,376,004 B1
(45) Date of Patent: Apr. 23, 2002

(54) SOUP AND SAUCE CONCENTRATES

(75) Inventors: Gijsbert Kuil; Johannes Frederik Mulder, both of Vlaardingen (NL)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/349,653

(22) Filed: Jul. 8, 1999

(30) Foreign Application Priority Data

Jul. 9, 1998 (EP) .............................. 98202330

(51) Int. Cl.⁷ ................................. A23L 1/40
(52) U.S. Cl. ................ 426/589; 426/506; 426/321
(58) Field of Search ................ 426/589, 587, 426/654, 650, 506, 321

(56) References Cited

U.S. PATENT DOCUMENTS

| | | | |
|---|---|---|---|
| 3,652,299 A | | 3/1972 | Penton |
| 3,676,154 A | * | 7/1972 | Glasser et al. ............... 426/589 |
| 4,291,066 A | * | 9/1981 | Anema et al. ............... 426/578 |
| 4,363,824 A | | 12/1982 | Willi et al. |
| 4,387,109 A | * | 6/1983 | Kahn et al. .................. 426/321 |
| 4,671,966 A | * | 6/1987 | Giddely et al. ............. 426/589 |
| 4,746,524 A | * | 5/1988 | Meyer ........................ 426/330 |
| 5,332,585 A | | 7/1994 | Odermatt et al. |
| 6,254,918 B1 | * | 7/2001 | Ammedick-Naumann et al. .......................... 426/589 |

FOREIGN PATENT DOCUMENTS

| | | |
|---|---|---|
| EP | 0 166 284 | 6/1985 |
| EP | 0 166 284 | 1/1986 |
| EP | 0 835 614 | 4/1998 |
| EP | 0 835 614 A2 | 4/1998 |
| GB | 1355907 | 6/1974 |

* cited by examiner

Primary Examiner—Nina Bhat
(74) Attorney, Agent, or Firm—Ellen Plotkin

(57) ABSTRACT

Provided are soup or sauce base concentrates which are ambient stable concentrates which yield, upon dilution with an aqueous liquid, a finished sauce, soup or gravy. Ambient stability is helped by a low water activity wherein the soup or sauce base concentrate includes at least on water activity lowering component such that the composition has a water activity of below 0.92 and where salt and starch are present in the soup or sauce base concentrate in a ratio of at least 1:0.5 to at most 1:7.

17 Claims, No Drawings

SOUP AND SAUCE CONCENTRATES

FIELD OF THE INVENTION

The present invention relates to ambient stable concentrates which yield, upon dilution with an aqueous liquid, a finished sauce, soup or gravy.

BACKGROUND OF THE INVENTION

Many products have been developed in the past intended as a concentrated sauce or soup product, which could be turned into a soup or sauce by the user by dilution with water.

U.S. Pat. Nos. 5,332,585, 4,468,551, 4,363,824 describe a process for the preparation of dry, granular soup- or sauce concentrates.

U.S. Pat. No. 3,996,993 and GB 1355907 describe soup- and sauce concentrates in the form of solid bars or blocks. U.S. Pat. No. 3,652,299 describe similar compositions in the form of pellets and beads.

U.S. Pat. No. 4,612,197 (or the equivalent EP 166 284) describes a sauce enhancer in tubes. The product disclosed is intended as a medium through which butter, egg, cream and other ingredients can be added to already prepared soups and sauces in order to improve consistency, flavour and appearance. The compositions disclosed contain egg yolk, cream, butter fat, salt, flavourings. Some compositions contain skim milk powder, kappa-carrageenan, or modified potato starch. EP 835614 describes a sauce aid in the form of an oil-in-water emulsion containing besides oil and water ungelatinised starch and a vegetable powder in a finely divided form. Emulsifiers are reported to be undesired in such formulations.

The products as described above are either difficult to dose because of their solid form, are not ambient stable products or products which have only ambient stability up till the moment of use or do not give a finished sauce or soup with sufficient thickening.

SUMMARY OF THE INVENTION

There has been a demand for concentrated base products which would be convenient in use, yield a finished sauce, soup or gravy only by dilution with water or an aqueous liquid. The composition should be such that there is no need to add other components besides water to arrive at a fully structured and finished sauce, although it should not be excluded. Also, said product should be microbial stable under room temperature, preferably even after opening the packed product. Preferably, the product should also be physically stable under ambient conditions (i.e. no substantial oil exudation or phase separation). The product should preferably be pourable, squeezable or spoonable.

It has now been found that the above objectives could be fulfilled (in full or in part) by a soup- or sauce base, comprising (in percentages by weight):

a. fat or oil, in an amount of 5–65% b. starch-based thickener, in an amount of 1–30% c. water, in amount of 10–55% d. egg-yolk based emulsifier, in an amount of 0.5–10% e. at least one water-activity-lowering component f. flavouring composition, in an amount of 1–35%, g. optionally acids wherein the amount of the water-activity-lowering component(s) is such that the composition has a water activity of below 0.92 and wherein salt and starch are present in a ratio of at least 1:0.5 and at most 1:7.

DETAILED DESCRIPTION OF THE INVENTION

The above concentrated compositions can be turned into a sauce or soup just by diluting with hot or cold water or an aqueous liquid such as e.g. wine, milk, water which is used for cooking meat or vegetables or mixtures thereof. Some stirring will generally be needed to obtain a homogeneous mixture. Heating will generally be desired to obtain the right consistency.

Although several water-activity reducing compounds as known in the art may be used for achieving the desired water activity, it is preferred (e.g. from a flavour point of view) that at least a certain amount of salt is present. Finished soups and sauces generally contain the same amount of salt (about 0.5–1.5%). Hence, the amount of salt present will determine the dilution factor to obtain a finished soup or sauce having the right quantity of salt. For example, a concentrated base product containing 4% of salt will e.g. be diluted using one part concentrated base composition and three parts water.

Next to salt, various sugars may be used to reduce the water activity. The amount of sugars and salt to be used will, apart from the desired water activity, also depend on the flavour to be achieved. Sugars (such as sucrose) may be used in amounts of 0.1–25%, preferably 1–15%.

The dilution factor and the amount of starch-based thickener will then determine whether a thick, creamy soup is obtained or a thick, creamy sauce is obtained. Finished soup will require typically 0.25–3% starch, whereas a sauce typically requires 1–6% of starch, depending on the type of starch used. The amount of starch-based thickener in the concentrated base product is preferably at least 2% and at most 25% by weight.

Following the above, in the compositions according to the invention the ratio salt:starch will typically be for soups at least 1:0.5 and at most 1:4, preferably at least 1:1 and at most 1:3. For sauces the ratio salt:starch will typically be for soups at least 1:2 and at most 1:7, preferably at least 1:3 and at most 1:5.

In order to achieve the desired content of salt on dilution of the concentrates according to the invention these concentrates contain preferably at least 3% of salt, or even 5% of salt, depending on the desired thickness in combination with dilution factor. The high content of salt will reduce the water activity Aw, thereby increasing the microbial stability at ambient conditions. Preferably the conditions are chosen such that the water activity is less then 0.92, more preferably less than 0.9. The Aw should preferably be at least 0.65. Most preferred is a water activity on between 0.70 and 0.90.

The microbial stability is also enhanced by reducing the pH. Preferably the pH is less than 5.5, more preferably less than 5.0. The pH is preferably at least 3.5, more preferably at least 4.0. Such a pH may be obtained by incorporating acids like acetic acid, lactic acid, citric acid and the like in these compositions, in an amount sufficient to obtain the desired pH.

In the concentrated soup- or sauce base according to the invention the amount of fat or oil is preferably at least 20% and at most 60% by weight. Generally speaking, the higher the amount of oil or fat present the lower the amount of water. Water is preferably present in an amount of at least 15% and at most 40% by weight.

In order to get the desired taste, consistency, and homogeneity the amount of egg yolk-based emulsifier in the concentrated soup- or sauce base is preferably at least 2% and at most 6% by weight.

Although the base product according to the invention may be used without any flavouring substance to provide a white base sauce or soup to which the end-user may add the own flavouring substances, it will generally be preferred to incorporate already in the concentrated soup- or sauce base a substance imparting flavour and/or aroma. These can be the known substances like herbs and spices, (ground) nuts and seeds, soy sauce, seasonings, flavouring oils, chopped vegetables (e.g. onions and garlic), wine etcetera. Also, to give a specific sauce or soup like e.g. mushroom-, tomato-, mustard-soup or -sauce, the (chopped) components like mushrooms, tomatoes, tomato paste, cream, mustard etcetera may also be incorporated in the compositions. Generally such compounds will be added in amounts 4 and 15% by weight, but in the case of e.g. soy sauce, this may be incorporated in the composition in amounts of 1–25%.

Although it is not preferred that all starch is already in its swollen state in the concentrated base product, as it would have a too thick consistency to be conveniently used, it may be preferred, depending upon the amount of oil and water used and the packaging used that at least part of the starch (e.g. 0.5–5% of the starch) is in its swollen state. The remainder of the starch will be swollen upon heating the concentrated base product in use, simultaneous or prior to diluting the concentrated base product. For maximum convenience, the soup- or sauce base according to the invention is preferably in a pourable or spoonable form. This will enable the product to be packed in (glass) jars, bottles (plastic and glass), tubs, etcetera.

As both oil/fat and water are present and a homogeneous product will be desired, the product will be in the form of an emulsion. It is preferred that the composition is an oil in water emulsion (O/W).

The concentrated base products according to the invention as described above may be used to prepared a ready-to-eat finished sauce by mixing it with an aqueous liquid, in a ratio of 1 part sauce base and between 2 and 7 parts aqueous liquid. The actual ratio will depend on factors as described above (amount of salt and thickener present and desired end result). Dilution may be effected using an aqueous liquid, such as water, wine, milk, cream, fruit and vegetable juices, liquid in which vegetables, meat or fish has been cooked, etcetera or any mixture thereof. Other dilution rates may be used if so desired.

Likewise, the concentrated base products according to the invention as described above may be used to prepared a ready-to-eat finished soup by mixing it with an aqueous liquid, in a ratio of 1 part sauce base and between 4 and parts aqueous liquid. The actual ratio will depend on factors as described above (amount of salt and thickener present and desired end result). Dilution may be effected in the way as with sauces described above. Other dilution rates may be used if so desired.

The invention is further exemplified by the following examples, which are to be understood as to be non-limiting.

EXAMPLES

Oil in water emulsions were prepared having the following compositions (in percentage by weight):

|  | comp. A | comp. B | Comp. C |
| --- | --- | --- | --- |
| Vegetable oil | 20 | 40 | 60 |
| Starch | 24 | 18 | 12 |
| Flavour mix | 8 | 6 | 4 |
| Egg yolk (92/8) | 2 | 4 | 6 |
| Salt | 6 | 4.5 | 3 |
| Water | 40 | 27.5 | 15 |
|  | 100% | 100% | 100% |

In the above, the vegetable oil used was soy bean oil. The starch was modified corn starch (Colflo 67, ex National Starch)

The flavour mix was composed of vegetable flavour, sugar, whitewine flavour, garlic powder, white pepper and citric acid.

The egg yolk was pasteurised stabilised egg yolk (treated with lecithase L-10 as known in the art) and consisted of 92% egg yolk and 8% salt.

Salt was ordinary kitchen salt.

Composition A was prepared by
mixing all ingredients (except oil and starch), heat to 85° C., keep for 3 minutes and cool to less than 20° C.
oil and starch were mixed to form a slurry and added under constant mixing
the product was homogenised in a colloid mill.

Compositions B and C were prepared by
mixing all ingredients (except oil and starch), heat to 85° C., keep for 3 minutes and cool to less than 20° C.
addition of half of the oil under constant mixing
homogenise in a colloid mill
the remainder of the oil was mixed with the starch to form a slurry and added to the rest of the formulation under constant mixing.

The above compositions appeared to have a water activity of around 0.85 and a pH of 4.7–4.8. All compositions A, B and C appeared physically and microbial stable for at least one month. Compositions B and C had paste-like consistency, composition A had a liquid consistency.

The compositions could be turned into ready to eat sauces of high quality by diluting them with water under heating and stirring for a few minutes.

Dilution factors:
one part composition A in 5 parts water
one part composition B in 3.5 parts water
one part composition C in 2 parts water.

What is claimed is:

1. Soup- or sauce base, comprising (in percentages by weight):
   a. fat or oil, in an amount of 5–65%
   b. starch-based thickener, in an amount of 1–30%
   c. water, in amount of 10–55%
   d. egg-yolk based emulsifier, in an amount of 0.5–10%
   e. at least one water-activity-lowering component
   f. flavouring composition, in an amount of 1–35%,
   g. optionally acids
wherein the amount of the water-activity-lowering component(s) is such that the composition has a water activity of below 0.92 and wherein salt and starch are present in a ratio of at least 1:0.5 and at most 1:7.

2. Soup- or sauce base according to claim 1, wherein salt and starch are present in a ratio of between 1:2 and 1:5.

3. Soup- or sauce base according to claim 1, wherein the water-activity lowering component comprises salt in an amount of at least 3% based on the final sauce- or soup base.

4. Soup- or sauce base according to claim 1, wherein the water-activity lowering component comprises a sugar in an amount of 0.1–25% based on the final sauce- or soup base.

5. Soup- or sauce base according to claim 1, wherein the amount of thickener is between 2 and 25%.

6. Soup or sauce base according to claim 1, wherein the water activity is between 0.70 and 0.90.

7. Soup- or sauce base according to claim 1, wherein the pH is below 5.5.

8. Soup- or sauce base according to claim 1, wherein the amount of fat or oil is between 20 and 60%.

9. Soup- or sauce base according to claim 1, wherein the amount of water is between 15 and 40%.

10. Soup- or sauce base according to claim 1, wherein the amount of egg yolk-based emulsifier is between 2 and 6%.

11. Soup- or sauce base according to claim 1, wherein the amount of flavouring components is between 4 and 15% by weight.

12. Soup- or sauce base according to claim 1, containing from 1–25% by weight soy sauce.

13. Soup- or sauce base according to claim 1, wherein the starch-based thickener contains 0.5–5% swollen starch.

14. Soup- or sauce base according to claim 1, wherein the composition is in a pourable or spoonable form.

15. Soup- or sauce base according to claim 1, wherein the composition is an oil in water emulsion (O/W).

16. Process for preparing a ready-to-eat sauce, wherein a soup- or sauce base according to claim 1 is mixed with an aqueous liquid, in a ratio of 1 part sauce base and between 2 and 7 parts aqueous liquid.

17. Process for preparing a ready-to-eat soup, wherein a soup- or sauce base according to claim 1 is mixed with an aqueous liquid, in a ratio of 1 part sauce base and between 4 and 10 parts aqueous liquid.

* * * * *